United States Patent
Burke et al.

(10) Patent No.: US 6,356,628 B1
(45) Date of Patent: Mar. 12, 2002

(54) METHOD FOR PERFORMING CALL TRAFFIC PATTERN ANALYSIS

(75) Inventors: Terrence Burke, Evergreen Park, IL (US); Clifford A. Kohler, Kenosha, WI (US)

(73) Assignee: Insers Integrated Communications, Chicago, IL (US)

( * ) Notice: Subject to any disclaimer, the term of this patent is extended or adjusted under 35 U.S.C. 154(b) by 0 days.

(21) Appl. No.: 09/432,521

(22) Filed: Nov. 3, 1999

Related U.S. Application Data

(63) Continuation-in-part of application No. 09/356,287, filed on Jul. 16, 1999.

(51) Int. Cl.[7] .............................................. H04M 15/00
(52) U.S. Cl. .................. 379/112.06; 379/115; 379/119; 379/126; 379/133
(58) Field of Search ............................ 379/111, 112.01, 379/112.06, 112.07–112.08, 114.14, 114.28, 116, 119, 120, 121.03, 121.05, 126–127.01, 127.03, 127.05, 133–135; 455/405–411

(56) References Cited

U.S. PATENT DOCUMENTS

| | | | | |
|---|---|---|---|---|
| 4,979,207 A | * | 12/1990 | Baum et al. | |
| 5,027,388 A | * | 6/1991 | Bradshaw et al. | |
| 5,325,290 A | * | 6/1994 | Cauffman et al. | |
| 5,410,589 A | * | 4/1995 | Galligan | |

* cited by examiner

*Primary Examiner*—Duc Nguyen
(74) *Attorney, Agent, or Firm*—Greer, Burns & Crain, Ltd.

(57) ABSTRACT

A method for developing a call traffic pattern for a company having a plurality of remotely located facilities is disclosed. A long distance carrier phone bill is examined to determine which call records correspond to intra-company calls. The intra-company call records are then grouped by originating company facility. Data from the grouped call records are then summed and examined to assemble a call traffic pattern. The call traffic pattern may include total charges for intra-company calls by facility, total calls by facility, total call duration by facility, peak phone usage by facility, and time of peak usage by facility. The call traffic pattern may be particularly useful in designing a voice over data network solution for a company.

18 Claims, 5 Drawing Sheets

US 6,356,628 B1

METHOD FOR PERFORMING CALL TRAFFIC PATTERN ANALYSIS

CROSS REFERENCE

The present invention is a continuation in part of U.S. application Ser. No. 09/356,287, filed Jul. 16, 1999.

FIELD OF THE INVENTION

The present invention relates to methods for determining a call traffic pattern for a company having a plurality of facilities.

BACKGROUND OF THE INVENTION

In the modern economy, many business entities have a plurality of remotely located facilities. Each of these plurality of facilities are equipped with phone service over public switched telephone networks ("PSTN") for communication by phone with each other as well as for communication with the rest of the outside world. For long distance telephone service, the company will choose a long distance carrier ("LDC"), such as SPRINT, MCI, AT&T, etc., that will be accessed over the PSTN.

The LDC provides the company with a monthly phone bill for all long distance calls made by the company. The phone bill may include a listing of all billed individual call originating numbers, terminating numbers, duration, associated charge, and time of occurrence. As a given company may have a large number of facilities each with a large number of phones, the monthly phone bill may be extremely large. Typically, one bill is delivered for a domestic corporation covering phone records for all facilities. For convenience, the bill is often presented in digital form on magnetic or optical computer readable disks. Depending on the size of the billed company and associated call volume, it is not uncommon for these bills to include hundreds of thousands of individual phone records. These digital phone bills are commonly known as call data records, and are provided in a number of formats.

In recent times, alternatives to LDC and PSTN services have begun to emerge for two way telephony voice communication. As an example, practical methods have recently been developed for providing intra-company voice telephony communication over a data network between remote facilities. In order to effectively configure and manage a data network for such telephony communication, information regarding the company telephone calling traffic is required.

This information may be characterized as a "call traffic pattern". A call traffic pattern may comprise the volume, duration, peak usage, as well as other information regarding telephony communication between individual company facilities. With such information, a data network may be configured with the proper bandwidth and portal capacity to accommodate expected telephony traffic.

The most convenient place to obtain such information is from a LDC phone bill. Unfortunately, no methods are heretofore known for effectively and conveniently extracting the required information from a LDC pone bill and developing a call traffic pattern with the extracted information.

OBJECTS OF THE INVENTION

It is an object of the invention to provide a method for developing a call traffic pattern.

SUMMARY OF THE INVENTION

The present invention comprises a method for developing a call traffic pattern for a company having a plurality of remote facilities. The method generally comprises the s steps of obtaining a company phone bill, extracting from the phone bill a subset of call records comprising all intra-company phone call records, compiling a plurality of secondary call record groupings from the intra-company subset, each individual of the secondary groupings comprising intra-company call records for calls originating from one of, and preferably from each of, the plurality of facilities; and using the secondary groupings to develop a call traffic pattern.

The call traffic pattern Generally comprises a facility by facility record and analysis of intra-company calls. Preferably, data from the individual call records are preferably compiled, summed, and summarized on a facility by facility basis within the call traffic pattern. The preferred traffic pattern comprises total charges for intra-company calls made from each facility, total number of calls made from each facility, total duration of calls made from each facility, peak time of occurrence for calls made from each facility, peak usage for calls made from each facility, and total calls terminating at each facility.

As a company phone bill may be quite large, and may in fact contain the records of hundreds of thousands of individual phone calls, the phone bill is preferably obtained in a computer readable format such as on a magnetic or optically readable disk. The most common LDC's use formats for such bills, which are generally known as call detail records. For example, AT&T provides its corporate customers a phone bill in CD ROM format, under the AT&T tradename "Billing Edge". LDC's such as Sprint, MCI Worldcom, and Quest also provide phone bills in computer readable format. The formats used by each LDC tend to be different.

Additionally, in a most preferred embodiment, the method of the invention comprises the further step of programming a computer to accept the computer readable phone bill as input and to perform the steps of the method as generally outlined above. As used herein, the term "computer" is intended to include virtually any device having a central processing unit, and may include, by way of example, personal computers, mainframe computers, handheld computers, as well as devices programmed for a specific purpose having a central processing unit.

The call traffic pattern developed through the method of the invention is particularly useful as a design tool in designing a digital telephony intra-company network.

The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the several embodiments of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
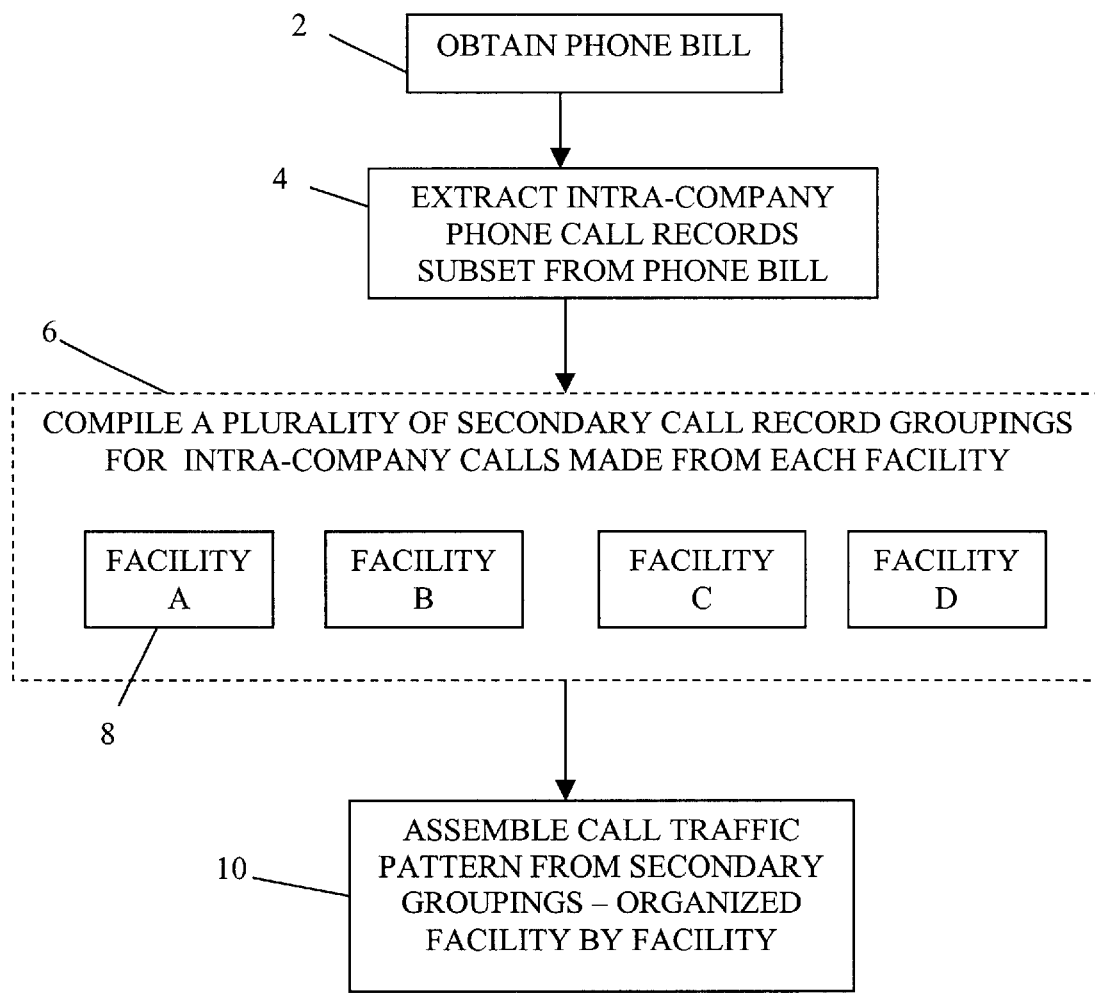
FIG. 1 is a flow chart illustrating the general steps of an embodiment of the method of the invention.

In order to best describe the preferred embodiments of the invention, a general overview of the method of the invention will be helpful. Accordingly, FIG. 1 is a flowchart illustrating in brief the general method of the invention. At 2, a phone bill is obtained for a company having a plurality of remotely located facilities. The phone bill may be issued by a LDC, and preferably summarizes phone usage and charges for a period of time. It contains a plurality of individual call records. A subset of call records is extracted from the phone bill at 4, corresponding to intra company phone calls (i.e., calls made from one facility to another). A plurality of smaller secondary groupings are compiled at 6 from the intra company subset extracted at 4. The smaller groupings correspond to intra-company calls originatin from each individual facility, such as grouping 8 representing all intra-company phone calls originating from Facility A. A call traffic pattern is developed from the groupings at 10. The call traffic pattern comprises a data set organized in a facility specific manner, and preferably comprises at least total intra-company phone charges billed for each individual facility.

Table 1 presents an example phone bill that may be obtained within the method of the invention. Table 1 is intended to illustrate a small portion of a corporate phone bill, which may in fact comprise of the order of from thousands to millions of individual phone call records. Accordingly, it will be noted that Table 1 contains records for the time period of 9:04 AM to 9:22 AM on Jul. 1, 1999, and is intended to be an example only. Because the phone bill may be extremely large, it is preferably provided in a computer readable, digital format. As noted above herein, several industry formats for such bills are known, and may generally be referred to as "call detail records". Accordingly, the format of Table 1 is intended to be for example purposes only; actual call detail records may differ in format.

As illustrated in Table 1, a call detail record may comprise a listing for each call record of a "bill to" phone number (i.e. phone number charged), an originating phone number (i.e., phone extension from which call originated), a terminating phone number (i.e., the number dialed and to which the call terminated at, also referred to as "destination number"), a call duration time (i.e., length of the phone call), a call occurrence time (i.e., time at which call began), and a call charge. It is noted that the bill to number and the originating number may differ for a given call due to switchboards which may control several individual lines. For example, a call may be originated in an office on an extension, but be billed to the number of the company switchboard that the call goes through.

TABLE 1

Phone Charges to ACME Manufacturing for July 1999

| Record | Bill to No. | Originating No. | Terminating No. | Duration: (min.) | Occurrence: (CST) | Charge: ($) |
| --- | --- | --- | --- | --- | --- | --- |
| 1 | 312-333-1000 | 312-333-1002 | 219-866-3489 | 4.3 | 9:04 AM 7-1-99 | 0.37 |
| 2 | 312-333-1000 | 312-333-1004 | 213-222-1002 | 17.2 | 9:05 AM 7-1-99 | 1.73 |
| 3 | 713-777-1000 | 713-777-1003 | 503-555-1002 | 10.5 | 9:05 AM 7-1-99 | 1.50 |
| 4 | 213-222-1000 | 213-222-1002 | 305-628-7336 | 2. | 9:05 AM 7-1-99 | 0.22 |
| 5 | 612-666-1000 | 612-666-1001 | 504-545-7878 | 3.4 | 9:07 AM 7-1-99 | 0.32 |
| 6 | 503-555-1000 | 503-555-1005 | 312-333-1008 | 17.2 | 9:07 AM 7-1-99 | 1.73 |
| 7 | 713-777-1000 | 713-777-1006 | 813-888-9987 | 10.5 | 9:09 AM 7-1-99 | 1.50 |
| 8 | 312-333-1000 | 312-333-1009 | 305-334-4545 | 38.4 | 9:14 AM 7-1-99 | 3.23 |
| 9 | 312-333-1000 | 312-333-1007 | 504-545-7879 | 23.2 | 9:16 AM 7-1-99 | 2.90 |
| 10 | 503-555-1000 | 503-555-1010 | 800-739-5463 | 1.8 | 9:16 AM 7-1-99 | 0.0 |
| 11 | 503-555-1000 | 503-555-1002 | 039-962-9888-54 | 13.7 | 9:17 AM 7-1-99 | 42.3 |
| 12 | 713-777-1000 | 713-777-1001 | 312-333-1008 | 2. | 9:17 AM 7-1-99 | 0.22 |
| 13 | 213-222-1000 | 213-222-1009 | 219-543-8787 | 2.6 | 9:22 AM 7-1-99 | 0.29 |
| 14 | 612-666-1000 | 612-666-1002 | 213-222-1003 | 3.4 | 9:25 AM 7-1-99 | 0.32 |
| 15 | 503-555-1000 | 503-555-1003 | 713-777-1001 | 17.2 | 9:25 AM 7-1-99 | 1.73 |
| 16 | 713-777-1000 | 713-777-1007 | 901-999-1919 | 19.4 | 9:25 AM 7-1-99 | 2.30 |

TABLE 1-continued

Phone Charges to ACME Manufacturing for July 1999

| Record | Bill to No. | Originating No. | Terminating No. | Duration: (min.) | Occurrence: (CST) | Charge: ($) |
|---|---|---|---|---|---|---|
| 17 | 213-222-1000 | 213-222-1001 | 813-888-9987 | 10.5 | 9:09 AM 7-99 | 1.50 |
| 18 | 612-666-1000 | 612-666-1009 | 305-334-4545 | 14.1 | 9:14 AM 7-1-99 | 1.33 |
| 19 | 503-555-1000 | 503-555-1009 | 504-545-7878 | 10.1 | 9:16 AM 7-1-99 | 1.38 |
| 20 | 713-777-1000 | 713-777-1008 | 312-333-1004 | 2. | 9:17 AM 7-1-99 | 0.22 |
| 21 | 312-333-1000 | 312-333-1009 | 612-666-1008 | 2.4 | 9:22 AM 7-1-99 | 0.28 |

Figure 2:
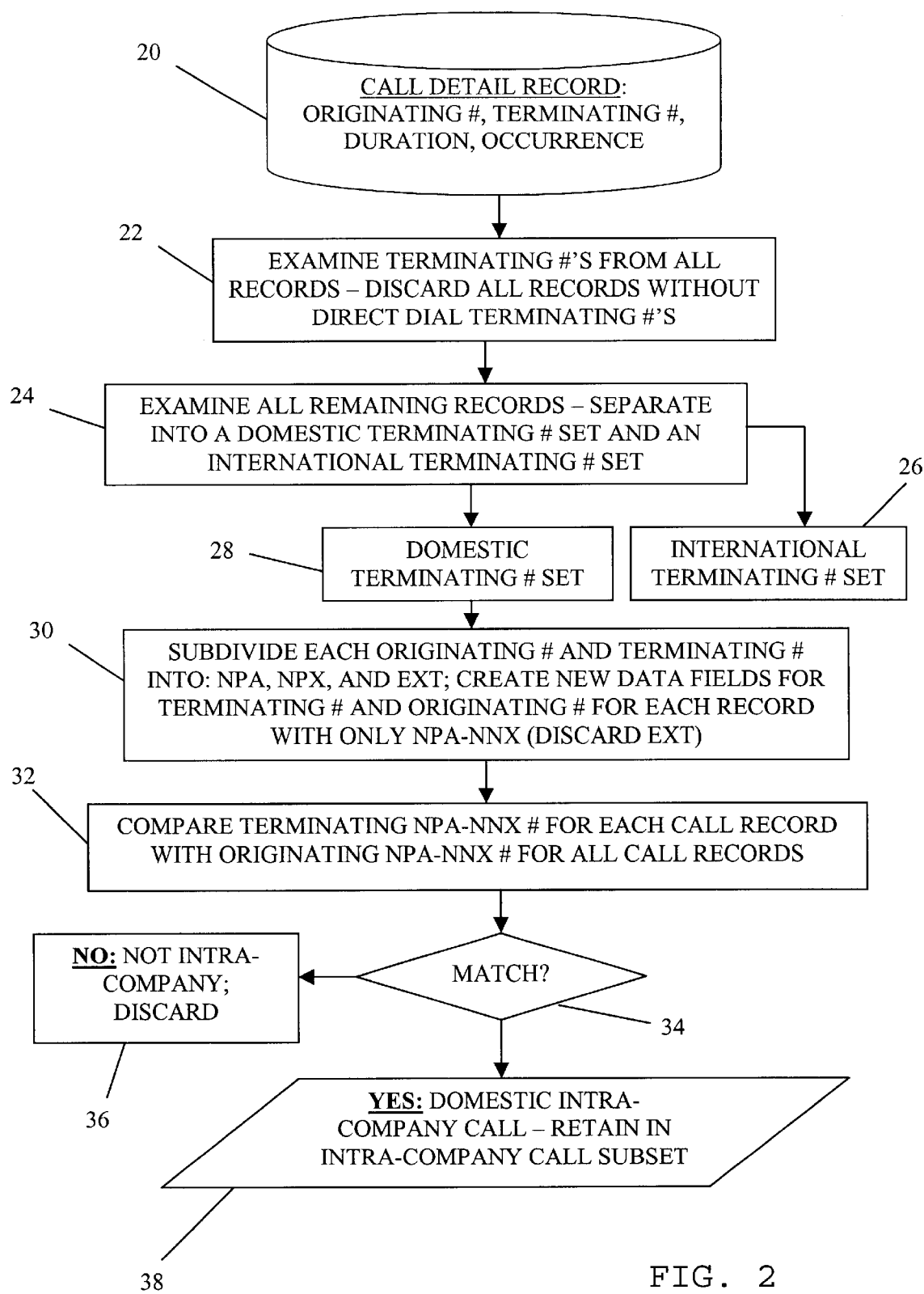
FIG. 2 is a flow chart illustrating steps of an embodiment of the method of the invention for assembling an intra-company call record subset.

FIG. 2 is a flow chart illustrating a preferred embodiment of the method of the invention, as to be performed on a computer. As a call detail record may be extremely large, use of a computer in practicing the method of the invention has been found to be very useful. At 20, a digital call detail record is input to the computer. The individual call records are examined at 22 to filter out all records without a direct dial termination number, and to filter out calls with an 800 prefix. These calls represent toll free calls or calling card calls that are not intra-company phone calls. Referring to Table 1 for illustration, phone record 10, which has an 800 prefix termination number, would be filtered out at node 22 of FIG. 2.

Remaining records are then examined to separate international calls from domestic calls by the computer at node 24 of FIG. 2. Referring once again to Table 1 by way of example, record 11, which has an international termination number, would be separated and placed in an international terminating record data set 26, while the remaining domestic records would be placed in set 28.

It has been found that it is practical to deal with domestic call records separate from international call records for a variety of reasons. Primary among these reasons is that companies having a multinational presence are typically organized into separate companies in separate nations. As a particular intended purpose of the present method is to provide a tool for designing an intra-company digital telephony network, it is most practical to focus on company facilities only, which are typically within a single country.

Figure 3:
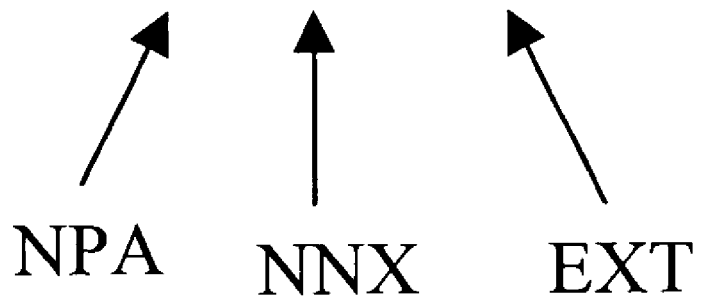
FIG. 3 is a diagram showing the various portions of a phone number.

At node 30 of FIG. 2, the computer subdivides individual originating and terminating numbers into various portions, as shown generally in FIG. 3. As illustrated, a ten digit phone number may be divided into an "NPA" portion corresponding to an area code, an "NNX" portion corresponding to the second three digits of a number, and an "EXT" portion corresponding to an "extension". At node 30 of FIG. 2, the EXT portion of each originating number and terminating number is eliminated, with the resultant NPA-NNX number portions stored in newly created data fields.

Originating and terminating number data strings are preferably reduced to NPA-NNX portions for a few reasons. For one, the smaller strings are easier to work with. When analyzing hundreds of thousands or even millions of records, the savings in processor time realized by the string reduction can be significant. Further, the elimination of the EXT portion of the numbers increases the accuracy of determining intra-company calls in the subsequent comparison step, where each terminating number will be compared with all originating numbers to determine intra-company calls. By eliminating the EXT portion of calls, the subsequent comparison will not be limited to particular extensions, but will instead have an identifier associated with a switchboard and a number of extensions. Thus a termination extension within a company facility that does not show up on the phone bill as an originating number (i.e., phone calls made to that extension but not made from that extension during the billing period) will be correctly flagged.

Reducing, or "parsing", numbers to NPA-NNX portions of course assumes that each facility has an NPA and NNX portion unique to one another. Should this not be the case, the method of the invention may of course compare complete numbers, or may use NPA-NNX and at least a portion of the EXT portion for comparison. It is also noted that the preferred parsing to only an NPA-NNX portion may result in some extra-company calls being identified as intra-company. If an intra-company call coincidentally has the same MPA-NMY string as an extra-company call, the extra-company call will be identified as being intra-company. It has been found, however, that the expected occurrence of such errors is so low as to be negligible.

Referring once again to the sample phone bill for the Acme Corp. shown in Table 1, operation of node 30 by the computer will result in additional data fields being created for each record as illustrated in Table 2. Note that records 10 and 11 are not present in Table 2 as they have been previously filtered out.

TABLE 2

| Record | Originating No. | Terminating No. |
|---|---|---|
| 1 | 312–333 | 219–866 |
| 2 | 312–333 | 213–222 |
| 3 | 713–777 | 503–555 |
| 4 | 213–222 | 305–628 |
| 5 | 612–666 | 504–545 |
| 6 | 503–555 | 312–333 |
| 7 | 713–777 | 813–888 |
| 8 | 312–333 | 305–334 |

TABLE 2-continued

| Record | Originating No. | Terminating No. |
|--------|-----------------|------------------|
| 9      | 312–333         | 504–545          |
| 12     | 713–777         | 312–333          |
| 13     | 213–222         | 219–543          |
| 14     | 612–666         | 213–222          |
| 15     | 503–555         | 713–777          |
| 16     | 713–777         | 901–999          |
| 17     | 213–222         | 813–888          |
| 18     | 612–666         | 305–334          |
| 19     | 503–555         | 504–545          |
| 20     | 713–777         | 312–333          |
| 21     | 312–333         | 612–666          |

The computer next performs a comparison at node 32 between the termination number for each record with the origination number from all records, with the goal of creating a subset of records corresponding to intra-company calls. The logic underlying the comparison is simply that a call made from a company phone to a company phone is an intra-company call. It will be appreciated that there are many other potential methods for determining intra-company calls. As an example, the company may supply a listing of company phone numbers. A comparison could then be made between terminating numbers and the company provided listing. The preferred method described herein, however, has been found to be most effective as all required information is conveniently contained within the call detail record.

It is further noted that some LDC digital call detail records do not report all information directly. As an example, call detail records from the Sprint LDC do not include originating numbers by phone number. Instead, originating phone numbers are identified by a code. As will be understood by those skilled in the art, it is a straightforward matter to convert the code to a phone number once a key to the code is provided. The present invention further comprises methods by which a coded bill to, originating, or terminating number may be converted using a code key supplied by the company or by the LDC to an actual phone number.

As generally described above, FIG. 2 illustrates at node 34 the matching decision to be made upon comparison of a terminating number with all originating numbers. If no match occurs, the call record is determined to be extra-company and discarded at 36. If a match occurs, the call record is determined to be an intra-company call and is added to anintra-company call record subset at 38.

Referring once again to the sample data fields shown in Table 2, it can be seen that terminating numbers from records 1, 4, 5, 7–9, 13, and 16–19 do not match any originating numbers, These call records are thus concluded to be extra-company and are discarded. Records 2, 3, 6, 12, 14, 15, and 20–21, on the other hand, have terminating numbers that match originating numbers and are thus determined to be intra-company calls. A subset of call records consisting of these records results, as is illustrated in Table 3.

TABLE 3

Intra-Company Call Subset

| Record | Bill to No. | Originating No. | Terminating No. | Duration (min.) | Occurrence | Charge | Parsed Originating No. | Parsed Terminating No. |
|--------|-------------|-----------------|------------------|------------------|-------------|--------|-------------------------|--------------------------|
| 2  | 312-333-1000 | 312-333-1004 | 213-222-1002 | 17.2 | 9:05 AM 7-1-99 | 1.73 | 312-333 | 213-222 |
| 3  | 713-777-1000 | 713-777-1003 | 503-555-1002 | 10.5 | 9:05 AM 7-1-99 | 1.50 | 713-777 | 503-555 |
| 6  | 503-555-1000 | 503-555-1005 | 312-333-1008 | 17.2 | 9:07 AM 7-1-99 | 1.73 | 503-555 | 312-333 |
| 12 | 713-777-1000 | 713-777-1001 | 312-333-1008 | 2.   | 9:17 AM 7-1-99 | 0.22 | 713-777 | 312-333 |
| 14 | 612-666-1000 | 612-666-1002 | 213-222-1003 | 3.4  | 9:25 AM 7-1-99 | 0.32 | 612-666 | 213-222 |
| 15 | 503-555-1000 | 503-555-1003 | 713-777-1001 | 17.2 | 9:25 AM 7-1-99 | 1.73 | 503-555 | 713-777 |
| 20 | 713-777-1000 | 713-777-1008 | 312-333-1004 | 2.   | 9:17 AM 7-1-99 | 0.22 | 713-777 | 312-333 |
| 21 | 312-333-1000 | 312-333-1009 | 612-666-1008 | 2.4  | 9:22 AM 7-1-99 | 0.28 | 312-333 | 612-666 |

Figure 4:
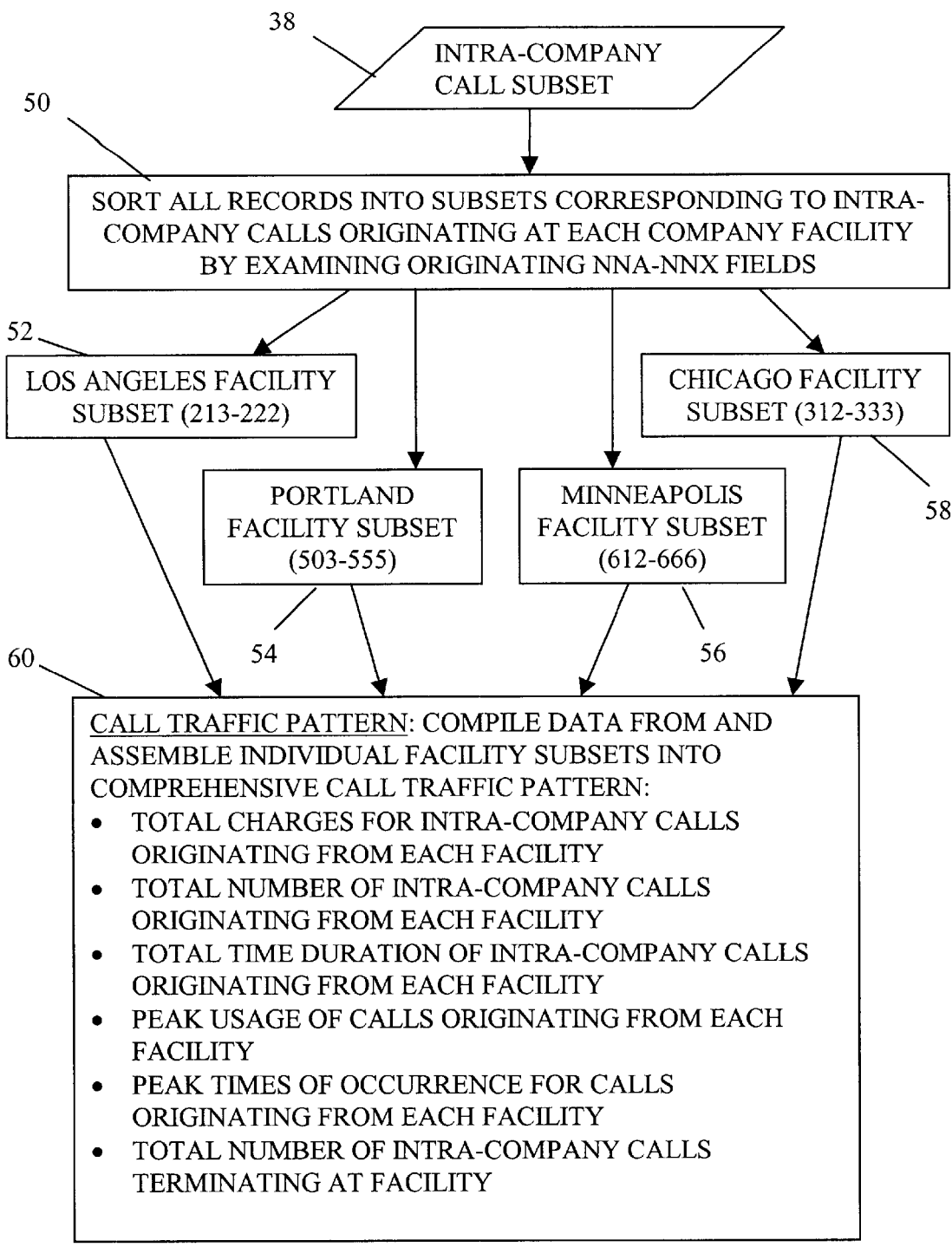
FIG. 4 is a flow chart illustrating steps of an embodiment of the method of the invention for developing a call traffic pattern from an intra-company call record subset.

FIG. 4 is a flowchart illustrating the preferred steps required to convert the subset of intra-company calls into a call traffic pattern. It is again noted that the preferred embodiment of the method of the invention utilizes a computer to carry out the steps as illustrated in FIG. 4.

At node 50, the intra-company call subset compiled at node 38 of FIG. 3 (also illustrated in FIG. 4 for clarity) is sorted to create a plurality of secondary groupings of call records corresponding to intra-company calls originating at each facility. Sorting is preferably performed using the parsed NPA-NNX originating numbers. Using the sample intra-company call record data set shown in Table 3, four groupings 52, 54, 56, and 58 are created. Group 52 contains call records for calls originating from a Los Angeles facility (213–222 parsed originating number), group 54 to call records for calls originating at a Portland facility (503–555 parsed originating number), group 56 to call records for calls originating at a Minneapolis facility (612–666 parsed originating number), and group 58 to call records for calls originating from a Chicago facility (312–333 parsed originating number). These groups are illustrated in Table 4.

TABLE 4

Facility by Facility Intra-Company Call Subsets

| Record | Bill to No. | Originating No. | Terminating No. | Duration (min.) | Occurrence | Charge | Parsed Originating No. | Parsed Terminating No. |
|---|---|---|---|---|---|---|---|---|
| Los Angeles Facility Originating Calls ||||||||||
| 3 | 713-777-1000 | 713-777-1003 | 503-555-1002 | 10.5 | 9:05 AM 7-1-99 | 1.50 | 713-777 | 503-555 |
| 12 | 713-777-1000 | 713-777-1001 | 312-333-1008 | 2. | 9:17 AM 7-1-99 | 0.22 | 713-777 | 312-333 |
| 20 | 713-777-1000 | 713-777-1008 | 312-333-1004 | 2. | 9:17 AM 7-1-99 | 0.22 | 713-777 | 312-333 |
| Portland Facility Originating Calls ||||||||||
| 6 | 503-555-1000 | 503-555-1005 | 312-333-1008 | 17.2 | 9:07 AM 7-1-99 | 1.73 | 503-555 | 312-333 |
| 15 | 503-555-1000 | 503-555-1003 | 713-777-1001 | 17.2 | 9:25 AM 7-1-99 | 1.73 | 503-555 | 713-777 |
| Minneapolis Facility Originating Calls ||||||||||
| 14 | 612-666-1000 | 612-666-1002 | 213-222-1003 | 3.4 | 9:25 AM 7-1-99 | 0.32 | 612-666 | 213-222 |
| Chicago Facility Originating Calls ||||||||||
| 2 | 312-333-1000 | 312-333-1004 | 213-222-1002 | 17.2 | 9:05 AM 7-1-99 | 1.73 | 312-333 | 213-222 |
| 21 | 312-333-1000 | 312-333-1009 | 612-666-1008 | 2.4 | 9:22 AM 7-1-99 | 0.28 | 312-333 | 612-666 |

In node 60 of FIG. 4, a call traffic pattern is developed from the groups illustrated in Table 4. A resulting preferred call traffic pattern is shown in Table 5.

TABLE 5

Call Traffic Pattern

| Facility: | Total Charges for Intra-Company Calls Originating at Facility | Total Number of Intra-Company Calls Originating at Facility | Total Time Duration for Intra-Company Calls Originating at Facility | Peak Usage for Intra-Company Calls Originating at Facility | Peak time of Occurrence for Intra-Company Calls Originating at Facility | Total Duration of In-coming Intra-Company Calls |
|---|---|---|---|---|---|---|
| Los Angeles | $1.94 | 3 | 14.5 | 2 | 9:17–9:19 AM 7-1-99 | 14.5 |
| Portland | $3.46 | 2 | 14.4 | 2 | 9:25–9:32 AM 7-1-99 | 34.4 |
| Minneapolis | $0.32 | 1 | 3.4 | 1 | 9:25–9:28 AM 7-1-99 | 3.4 |
| Chicago | $2.01 | 2 | 19.6 | 2 | 9:22–9:23 AM 7-1-99 | 19.6 |

As illustrated, the call traffic pattern data totals for the individual facilities are presented in several categories. This provides for convenient and organized review of intra-company telephony characteristics, which is particularly useful for applications such as designing and/or managing an intra-company digital data telephony solution. It will be understood that the call traffic pattern illustrated is in the nature of an example only and uses only the brief call record as presented in Table 1 as input. In practice, the call record could more typically comprise of the order of from thousands to millions of call records, and from a few to several hundred facilities, with the resultant data reported in the call traffic pattern of Table 5 would be of much larger magnitude.

The various categories reported in the preferred call traffic pattern of Table 5 include:

Total Charges for Intra-company Calls Originating at Facility: This column presents the total amount billed to the company by the LDC for intra-company calls that originated at the respective facility.

Total Number of Intra-company Calls Originating at Facility: This column presents the total number of intra-company calls that originated at the respective facility.

Total Time Duration for Intra-company Calls Originating at Facility: This column presents the total time duration of all intra-company calls that originated at the respective facility.

Peak Usage for Intra-company Calls Originating at Facility: This column presents the peak number of simultaneous intra-company calls that originated at the respective facility, e.g. the peak number of calls that were being carried at any one time.

Peak Time of Occurrence for Intra-company Calls Originating at Facility: This column presents the time of day during which the peak usage occurred for the respective facility.

Total Duration of Intra-company Calls Terminating at Facility: This column presents the total duration in minutes of intra-company calls that terminated at the facility.

It is noted that in dealing with time data values, it may be of use to convert time to a non traditional clock standard, as is generally known in the art. For instance, traditional clock time may be converted to seconds or minutes past a start time. Military time is a general example of this type of conversion.

The data reported in the call traffic pattern can be critical to designing an intra-company digital telephony solution. Through such a solution, intra-company telephone calls can be carried over a digital data network with no associated LDC charges. The total charges billed, total number of calls, and total time duration for a facility as reported in the call traffic pattern therefore are indicative the value to the company of connecting that facility to a digital telephony network. The peak usage data can be used to estimate the maximum bandwidth of data network that will be required to carry the digital telephony signals. The peak time of usage is also useful for required network bandwidth estimation, as well as for digital data traffic management issues.

The total duration of incoming calls may be useful to supplement the decision making regarding whether a given facility is worth connecting to the data network. For example, it may be that a minimal number of calls originate at a given facility. In a preliminary analysis, it could therefore be concluded that cost benefits to be realized by connecting that facility to a digital telephony network would be minimal. Should it be shown, however, that a relatively large amount of calls were terminating at that facility, the value of connecting it to a digital telephony network would presumably be increased.

It will be appreciated that the method of the invention will prove valuable in numerous other contexts in addition to its application as a tool in the designing of an intra-company digital telephony network solution.

As described herein, the most preferred method of the invention will be carried out by a computer, as the various steps of the method require the examination, sorting, parsing, comparison, and assembling of large amounts of data. In practice, it has been discovered that spreadsheet and database application software such as the Excel and Access programs, respectively, available from the Microsoft Corporation in Redmond Wash. lend themselves well to being programmed to carry out the method of the invention. Most preferably, a combination of the two programs are used. Other examples of application spreadsheet and database software are well known and widely available.

Further, as noted above, the term "computer" as used herein is intended to comprise a variety of machines having a processing unit, including, but not limited to, a personal computer, a workstation, a mainframe, a handheld computer, a pre-programmed handheld device, and the like, as are known by those in the art.

In an additional embodiment of the method of the invention, a computer programmed to carry out the steps of the method is connected to a worldwide computer network such as is widely known as the Internet for remote access and operation. As noted above, a primary application of the method of the invention is use as a tool in providing digital data network telephony solutions to companies having a plurality of remotely located facilities. These companies are located virtually around the world; providing an interface with the method of the invention over the internet realizes significant time and travel related savings. It also provides an important business advantage as easy access encourages use by potential customers.

When assembling the call traffic pattern, it may also be beneficial to take into consideration a pre-existing data network connecting some of the plurality of company facilities. In particular, a company may have a plurality of facilities, some of which are connected to an intra-company data network for carrying digital data, while other of the facilities are not connected to the network. Focusing the call traffic pattern on only those facilities that are connected to the data network may result in easier decision making and analysis.

An additional embodiment of the method of the invention therefore includes an additional step of identifying intra-company call records originating from facilities that are connected to the data network. Only these call records will be considered when assembling the call traffic pattern. Mechanically, the sorting of intra-company calls originating from a connected facility from those originating from an un-connected facility can only be done with additional input. Specifically, a list of phone numbers, or at least NPA and/or NNX portions thereof, will need to be supplied by the company in addition to the phone bill. Alternatively, the locations of un-connected facilities could be supplied from which the NPA portion of a phone number could be determined.

As mentioned above, it has been found that most corporations, even if they have multi-national presence, are organized as domestic companies for various tax and accounting reasons. Taking the "Acme" corporation as an example, it may be that an Acme America Corporation exists, a separate Acme Germany Corporation, and a separate Acme Hong Kong Corporation. While all individual corporations may have a common owner and a close relationship to one another, it has been found that they tend to operate independently with respect to telephony billing and contracting activities. For this reason, the preferred method of the invention focuses on developing a call traffic pattern analyzing domestic intra-company calls only.

An additional embodiment of the invention, however, comprises a method in which the international calls as determined at node 26 of FIG. 2 will be utilized in formulating a call traffic pattern. In the additional steps of this embodiment, more focus will be placed on terminating call numbers than originating numbers. This is due to the consideration that the only benefit to a domestic corporation in connecting a foreign facility to an intra-company digital data telephony network will be the elimination of outgoing phone charges. This follows from the assumption that the foreign facility is billed separately for its phone usage; thus the domestic corporation will not benefit in a reduction of the charges to the foreign facility.

If it can be shown, however, that a significant cost is being carried by the domestic corporation for placing calls to the foreign facility, the domestic corporation may be able to realize a cost benefit by connecting the foreign facility to a data network for carrying telephony. Thus this embodiment of the method of the invention will show the total cost associated with calls billed to the domestic corporation that terminate at the foreign facility.

As the phone bill does not include charges to the foreign facility, no listing of foreign originating numbers is available from the phone bill. Thus there is not sufficient information in the phone bill in and of itself to conclusively determine whether a phone record having an international terminating number was made to a foreign intra-company facility or was extra-company. Two general approaches are offered for solving this problem. As a first, data may of course be provided by the company in addition to the phone bill. In particular, the company may provide phone numbers for foreign intra-company facilities. These numbers could then be compared to the international terminating numbers collected at node 26 to determine which were intra-company.

The second approach to determining which international phone calls are intra-company takes a probabilistic approach. Generally, the international phone calls are grouped and examined to determine terminating numbers in the phone bill of high frequency. It has been found that such numbers very frequently correspond to intra-company calls. Confirmation of the assumption that a frequently called international number is indeed an intra-company call can of course be obtained from the company.

Figure 5:
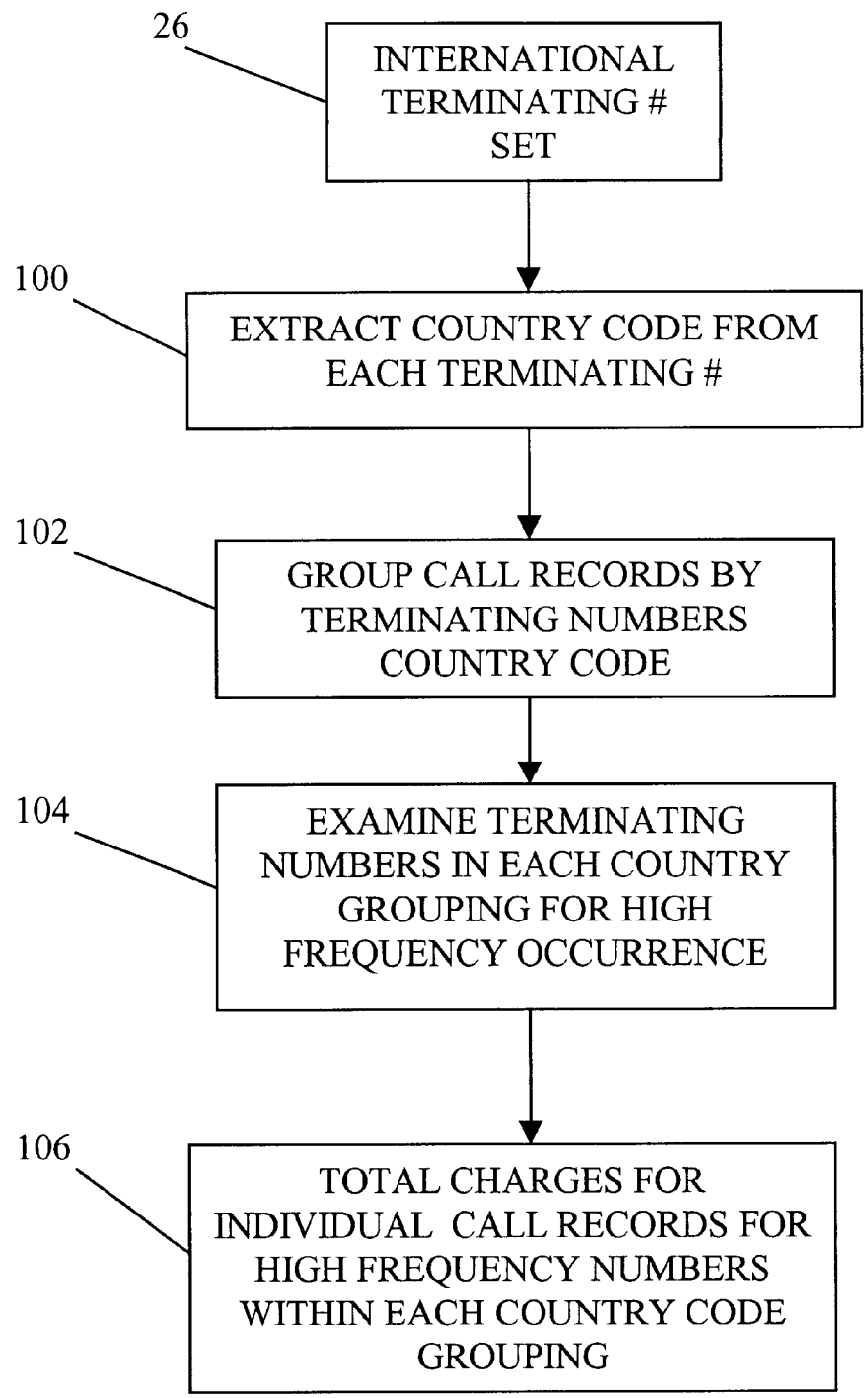
FIG. 5 is a flow chart illustrating steps of an embodiment of the method of the invention for considering international intra-company call records.

The flow chart of FIG. 5 illustrates the second approach. The international terminating number set at node 26 corresponds to the node 26 of FIG. 2. At node 100, the international country code, which is typically a two or three digit prefix to a phone number identifying the destination country, is extracted from the terminating number. The call records are then grouped by terminating number country code at node 102.

Each individual country grouping is then examined at node 104 for terminating numbers of high frequency of occurrence. It is preferred that such an examination is not performed using the entire terminating number string for reasons as explained above. Generally, such a comparison is inefficient in the sense that required processor time is high, and that intra-company numbers are "missed" as different extensions may mask a company facility. Examination preferably therefore occurs based on an NPA-NNX type comparison as explained above. As different countries may have different numbers of digits corresponding for instance to area codes, and city codes, however, the analysis may vary slightly from country to country.

Total charges for frequently called terminating numbers for each respective country grouping are then summed at node 104. The resulting data indicates total charges for calls originating at any domestic facility and terminating in each individual country. This data will be incorporated in the call traffic pattern of this embodiment of the method of the invention.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

As an example, it will be obvious to those knowledgeable in the art that the specific order or number of method steps as disclosed herein may be altered without change to the underlying spirit and scope of the invention. As an example, the two steps of extracting a subset of intra-company calls and the subsequent step of assembling secondary facility specific groups from the subset could conceivably be reversed in order, or could be combined into a single step. Further, the present invention is not limited to any particular methods of sorting, comparing, storing, and other programming steps as disclosed herein. As will be appreciated by those knowledgeable in the art, many equal variations of these may exist, and are intended to fall within the scope of the claims.

What is claimed is:

1. A method for developing a call traffic pattern for a company having a plurality of remotely located facilities, comprising the steps of
   a) obtaining a phone bill, said bill having a record of phone calls made;
   b) extracting an intra-company call record subset from said phone bill;
   c) compiling a plurality of secondary call record groupings from said intra-company subset, each individual of said secondary call record groupings comprising intra-company calls originating from an individual of the plurality of facilities; and
   d) developing a call traffic pattern from said plurality of secondary call record groupings.

2. A method as in claim 1, wherein said phone bill comprises a LDC call detail record, having a record of each call made, said record comprising an originating number, a terminating number, call duration, and an associated charge.

3. A method as in claim 1, wherein said phone bill comprises a call detail record, having a record of each call made, said record for each call having a terminating number, a call duration, an associated charge, and a originating code corresponding to an originating number; and wherein the method comprises the further step of converting said originating code to an originating number.

4. A method as in claim 1, wherein said phone bill comprises a multiplicity of individual phone call records, each of said records having an originating number and a terminating number, and wherein said step of extracting said intra-company call record subset comprises the steps of
   a) comparing each of said terminating numbers with said originating numbers;
   b) placing all records having a terminating number matching an originating number in said intra-company subset comprising intra-company calls.

5. A method as in claim 4, wherein said originating numbers are obtained from said call detail record.

6. A method as in claim 4, wherein each of said originating numbers has an NPA code, an NNX code, and an EXT code, and wherein said step of comparing said terminating numbers with said originating numbers comprises comparing said NPA and NNX codes from said originating numbers with said NPA and NNX codes from said terminating numbers.

7. A method as in claim 1, wherein said phone bill comprises a listing of originating and terminating phone numbers; each of said phone numbers having an NPA code and an NNX code, and wherein said step of extracting said intra-company subset comprises comparing said NPA code and said NNX code from said terminating numbers with said NPA and NNX code from said originating numbers, said intra-company call record subset comprising all call records having said NPA code and said NNX code matching one of said originating number NPA code and NNX code.

8. A method as in claim 1, wherein said phone bill is in a digital format, and wherein the method further comprises the steps of programming a computer to accept said phone bill as input, programming said computer to perform said step of extracting an intra-company call subset; programming said computer to perform said step of extracting facility call groupings, and programming said computer to develop said call traffic pattern.

9. A method as in claim 8, further comprising the step of connecting said computer to a world-wide computer network whereby said call data record may be input over said network.

10. A method as in claim 1, wherein a plurality of the company facilities are connected by a data network, and wherein said call traffic pattern comprises an analysis of intra-company calls made from facilities connected by the data network to another of the facilities connected by a data network, said analysis comprising at least total calls made, and total charges for calls made.

11. A method as in claim 1, wherein said phone bill comprises domestic and international calls, and wherein said method further comprises the step of separating intra-company domestic calls from international calls so that said intra-company call record subset comprises intra-company domestic call records.

12. A method as in claim 1, wherein said phone bill comprises domestic and international calls, and wherein the method further comprises the step of compiling subsets of intra-company international calls made to other countries.

13. A method as in claim 1, wherein said call traffic pattern comprises a summation of total charges for intra-company calls originating from each of the company facilities.

14. A method as in claim 13, wherein said call traffic pattern further comprises a summation of total number of intra-company calls made from each facility, total time duration for intra-company calls made from each facility, peak usage of calls originating from each facility, and peak times of occurrence of calls originating from each facility.

15. A method for using a computer to develop an intra-company call traffic pattern for a company having a plurality of remotely located facilities, the method comprising the steps of:
  a) inputting a computer readable phone bill; said phone bill having a multiplicity of individual call records, said records comprising a call originating number, a terminating number, a duration, and a charge;
  b) extracting a subset of call records corresponding to domestic intra-company calls from said phone bill; said extraction comprising the steps of:
    i) sorting domestic call records from international call records;
    ii) comparing said terminating numbers from each of said domestic records with said originating numbers from other of said domestic records,
    iii) placing domestic records having a terminating number that matches an originating number from other of said domestic records in said domestic intra-company call record subset;
  c) compiling a plurality of individual facility call record subsets from said domestic intra-company call record subset, each of said plurality of individual facility call record subsets comprising call records having an originating number corresponding to that respective facility,
  d) assembling a call traffic pattern from said plurality of individual facility call record subsets, said call traffic pattern comprising total intra-company phone call charges for calls originating at each respective facility, total number of intra-company calls originating from each respective facility, total time duration of intra-company calls originating from each respective facility, and peak usage of intra-company calls originating from each respective facility; and
  e) outputting said call traffic pattern.

16. A method as in claim 15, wherein each of said originating and terminating numbers has an NPA, an NNX, and an EXT portion, and wherein said step of comparing said terminating numbers to said originating numbers comprises comparing said NPA and NNX portions of one of said terminating numbers to said NPA and NNX portions of each of said originating numbers.

17. A method as in claim 15, wherein the method comprises the additional step of connecting the computer to a computer network and programming said computer to accept said input phone bill over said network and to provide said call traffic pattern output over said network.

18. A method as in claim 17 wherein said network comprises the internet.

* * * * *

UNITED STATES PATENT AND TRADEMARK OFFICE
CERTIFICATE OF CORRECTION

PATENT NO.    : 6,356,628 B1
DATED         : March 12, 2002
INVENTOR(S)   : Burke et al.

It is certified that error appears in the above-identified patent and that said Letters Patent is hereby corrected as shown below:

Title page,
Item [73], Assignee, please delete the following: "Insers Integrated Communications", and insert -- Insors Integrated Communications --
Item [56], References Cited, U.S. PATENT DOCUMENTS, please insert:
-- 5,933,481  8/1999  Macdonald
   5,809,491  9/1998  Kayalioglu et al.
   5,708,697  1/1998  Fischer
   5,410,586  4/1995  Davies --
Please insert:

OTHER PUBLICATIONS
STEVEN GUO; "Daily Traffic Analysis and Seasonal Adjustment, Abstract", 1996 International Conference for Communications Marketing, Forecasting and Demand Analysis, available on the World Wide Web at: http://www.econ.ilstu.edu/icfc/96progrm.htm; circa Jan 1996

J.G. MARKOULIDAKIS, G.L. LYBEROPOULOS, M.E. ANAGNOSTOU, "Traffic Models for Third Generation Cellular Mobile Telecommunication Systems", Abstract and Introduction, Wireless Information Networks, Issue 4, 1998, also available on the worldwide web at: http://telecom.ece.ntua.gr/~libero/REVIEW3.html, December 1996

J.G. MARKOULIDAKIS, G.L. LYBEROPOULOS, M.E. ANAGNOSTOU, "Traffic Models for Third Generation Cellular Mobile Telecommunication Systems", Abstract and Introduction, Wireless Information Networks, Issue 4, 1998, also available on the worldwide web at: http://telecom.ece.ntua.gr/~libero/REVIEW3.html, December 1996

AUSTRALIAN NATIONAL AUDIT OFFICE; "Telephone Call Centres Accompanying Handbook, Appendix B: Erlang Formulas for Modeling Incoming Telephone Traffic", available on the world wide web at: http://www.anao.gov/au/bpg_telecentres/telehbk1.html ANSAPOINT CALL CENTER SOFTWARE; "Call Center Design White Paper", available on the World Wide Web at wysiwyg://16/http://www.ansapoint.com/calldesign.html, circa Jan. 1999

INTEL, "Proshare Video Traffic – A Traffic Engineering Model for LAN Video Conferencing", available on the world wide web at http://support.intel.com/support/proshare/8150.htm, circa Jan 1999

Column 14,
Lines 9 and 37, please delete "of" and insert -- of: --

UNITED STATES PATENT AND TRADEMARK OFFICE
CERTIFICATE OF CORRECTION

PATENT NO. : 6,356,628 B1
DATED : March 12, 2002
INVENTOR(S) : Burke et al.

It is certified that error appears in the above-identified patent and that said Letters Patent is hereby corrected as shown below:

Column 16,
Line 19, please delete "facility" and insert -- facility; --

Signed and Sealed this

Third Day of May, 2005

JON W. DUDAS
*Director of the United States Patent and Trademark Office*